(12) United States Patent
Weber et al.

(10) Patent No.: US 7,123,418 B2
(45) Date of Patent: Oct. 17, 2006

(54) HEAD-UP DISPLAY WITH NARROW BAND REFLECTIVE POLARIZER

(75) Inventors: Michael F. Weber, Shoreview, MN (US); Andrew J. Ouderkirk, Woodbury, MN (US); John A. Wheatley, Lake Elmo, MN (US); Jonathan Brodd, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/192,942

(22) Filed: Jul. 29, 2005

(65) Prior Publication Data

US 2005/0270655 A1    Dec. 8, 2005

Related U.S. Application Data

(63) Continuation of application No. 10/335,458, filed on Dec. 31, 2002, now Pat. No. 6,952,312.

(51) Int. Cl.
*G02B 27/14* (2006.01)
*G02F 1/1335* (2006.01)

(52) U.S. Cl. .......................................... 359/630; 349/11
(58) Field of Classification Search ................ 359/630, 359/631, 632, 634, 635, 636, 637, 638, 639, 359/485, 487, 483; 345/7, 8; 349/11, 9
See application file for complete search history.

(56) References Cited

U.S. PATENT DOCUMENTS

| | | | |
|---|---|---|---|
| 3,609,023 A | 9/1971 | Turboult et al. |
| 3,610,729 A | 10/1971 | Rogers |
| 3,709,589 A | 1/1973 | Lamb et al. |
| 3,711,176 A | 1/1973 | Alfrey, Jr. et al. |
| 3,885,095 A | 5/1975 | Wolfson et al. |
| 3,915,548 A | 10/1975 | Opittek et al. |
| 4,697,879 A | 10/1987 | Gerbe |
| 4,737,001 A | 4/1988 | Moss |
| 4,886,328 A | 12/1989 | Iino |
| 4,900,133 A | 2/1990 | Berman |
| 4,981,332 A | 1/1991 | Smith |
| 4,987,410 A | 1/1991 | Berman et al. |
| 5,008,658 A | 4/1991 | Russay et al. |
| 5,050,966 A | 9/1991 | Berman |

(Continued)

FOREIGN PATENT DOCUMENTS

DE          37 39 062          11/1988

(Continued)

OTHER PUBLICATIONS

Weber et al., "Giant Birefringent Optics in Multilayer Polymer Mirrors", Science, vol. 287, Mar. 31, 2000, pp. 2451-2456.

*Primary Examiner*—Hung Xuan Dang
(74) *Attorney, Agent, or Firm*—Milena G. Higgins

(57) ABSTRACT

A head-up display includes a projection system and a window having a target area where a reflective polarizer is positioned to reflect light from the projection system to a viewing area. Light from the projection system is p-polarized and strikes exposed window surface(s) at an acute angle to reduce or eliminate multiple or "ghost" images. The acute angle is closely matched to a Brewster angle of the exposed window surface(s). The reflective polarizer includes a multilayer stack with refractive indices of individual layers chosen to reflect p-polarized light substantially more than s-polarized light over a wide angular range that includes the acute angle. The reflective polarizer also can reflect infrared light to reduce cabin heating from solar radiation.

14 Claims, 5 Drawing Sheets

U.S. PATENT DOCUMENTS

| | | |
|---|---|---|
| 5,053,755 A | 10/1991 | Smith et al. |
| 5,103,337 A | 4/1992 | Schrenk et al. |
| 5,122,614 A | 6/1992 | Zalipsky |
| 5,122,905 A | 6/1992 | Wheatley et al. |
| 5,325,218 A | 6/1994 | Willett et al. |
| 5,486,949 A | 1/1996 | Schrenk et al. |
| 5,497,271 A | 3/1996 | Mulvanny et al. |
| 5,502,456 A | 3/1996 | Korenaga et al. |
| 5,510,913 A | 4/1996 | Hashimoto et al. |
| 5,552,935 A | 9/1996 | Knoll et al. |
| 5,563,620 A | 10/1996 | Terai |
| 5,579,139 A | 11/1996 | Abileah et al. |
| 5,598,175 A | 1/1997 | Iino |
| 5,715,028 A | 2/1998 | Abileah et al. |
| 5,882,774 A | 3/1999 | Jonza et al. |
| 5,999,314 A | 12/1999 | Asakura et al. |
| 6,259,559 B1 | 7/2001 | Kobayashi et al. |
| 6,327,084 B1 | 12/2001 | Nishikawa et al. |
| 6,697,195 B1 | 2/2004 | Weber et al. |
| 6,744,478 B1 * | 6/2004 | Asakura et al. ............. 349/11 |
| 2004/0125450 A1 | 7/2004 | Hebrink et al. |
| 2004/0126549 A1 | 7/2004 | Ruff et al. |

FOREIGN PATENT DOCUMENTS

| | | |
|---|---|---|
| EP | 1 180 710 | 2/2002 |
| FR | 2 689 651 | 10/1993 |
| JP | 08169257 | 7/1996 |
| WO | WO 95/17303 | 6/1995 |
| WO | WO 96/19347 | 6/1996 |

* cited by examiner

HEAD-UP DISPLAY WITH NARROW BAND REFLECTIVE POLARIZER

CROSS REFERENCE TO RELATED APPLICATIONS

This application is a continuation of U.S. application Ser. No. 10/335,458, filed Dec. 31, 2002 now U.S. Pat. No. 6,952,312, now allowed.

FIELD OF THE INVENTION

The present invention relates to projection displays that allow a user to see, displayed information while keeping vision in the general direction of other sources of information. The displayed information can be reflected from a window, eyepiece component, or portion thereof through which the user can also view the other sources of information.

The term "Head-up display" (HUD) is used herein to refer to such display systems, whether employed in the window of a vehicle such as an aircraft, watercraft, or landcraft (including motor vehicles such as automobiles, trucks, and motorcycles), in smaller scale systems such as goggle lenses or helmet visors, or in other diverse applications.

BACKGROUND

A wide variety of HUD systems are known. Commonly, a projection system is combined with a partial mirror (a partial reflector and partial window) as the final optical component for forming a projected image viewable by the user. Simultaneously, the user can view other scenes through the partial mirror. The partial mirror is an important component affecting the usability of the display. Generally, the reflectivity of the partial mirror must be sufficient to reflect light from the projector, but the partial mirror must also be sufficiently transparent to provide adequate viewing through it.

The partial mirror is typically placed on a windshield, canopy, or other transparent substrate, generically referred to herein as a window. Alternatively, the bare surface of the window is sometimes used as the partial mirror itself. In either case the combination of reflection from the partial mirror, and reflection from one or both of the inner and outer surfaces of the window, can produce a multiple image, or "ghosting" problem. This problem becomes more noticeable as the window thickness increases and the line-of-sight through the window becomes more oblique. For typical systems, ghosting problems become more noticeable for window thicknesses on the order of about 1 mm and up.

One known solution to this problem is to wedge the inner and outer surfaces of the window so that the (predominantly s-polarized) light reflecting off one surface is angularly separated from light reflecting off of the partial mirror or opposite surface. However, adding a wedge to a windshield can increase cost and manufacturing complexity. Further, achievable wedge angles for practical devices are very limited.

FIG. 1 depicts another known HUD system, disclosed in U.S. Pat. No. 5,999,314 (Asakura et al.). The system, S, includes a polarization-direction changing layer 2 bonded to the inboard surface of an outboard-side glass plate 1A which, together with an inboard-side glass plate 1B and an intermediate film 4 (polyvinyl butyral or the like), forms a laminated glass 5 used for an automotive front windshield glass W. Light from a displaying device 6 passes through a polarizer 7 so that the light is p-polarized (polarized in the plane of incidence). A Brewster's angle regulating film 3, made of $TiO_2$, is formed at the inboard surface of plate 1B. P-polarized light from the displaying device 6 is incident on laminated glass 5 at Brewster's angle ($\theta=63°$) of the Brewster's angle regulating film 3. No reflection is made at the inboard surface of plate 1B because the p-polarized light is incident at Brewster's angle. The light that thus enters laminated glass 5 then reaches polarization-direction changing layer 2, where the p-wave is rotated into an s-wave. The resulting s-polarized light is then partially reflected (about 20%) at an outboard surface of plate 1A. The reflected s-polarized light is re-converted to p-polarized light upon passing again through layer 2. This p-polarized light then passes through film 3 for observation by eyes 8 of the driver. The reference also discusses forming an optional reflection film 9 (a thin film of Al, Au, Ag, or Cu) at the outboard surface of plate 1A to further increase reflectivity. By eliminating reflection of light from displaying device 6 off the inboard surface of plate 1B, and by providing negligible reflection from other interfaces seen in the figure, the reference states that a double image cannot be formed.

One problem with the system of FIG. 1 is its reliance on reflection at an outer window surface, where water, ice, dirt, and the like can greatly distort or impair the image quality. Another problem is its reliance on a polarization-direction changing layer: such a layer that works well at large angles of incidence and over the entire visible spectrum is difficult to make, and is not generally available.

Other known HUD systems project other types of polarized light toward the viewer, such as s-polarized light or circularly polarized light. Generally, such systems suffer from the fact that some or all of the image light directed toward the viewer is polarized in a horizontal plane, which is the very polarization component rejected by ordinary polarized sunglasses. Thus if such sunglasses were used, the projected image would become substantially more difficult to see.

Thus, a need remains in the art for improved HUD systems in which ghosting is reduced or eliminated.

BRIEF SUMMARY

In brief summary, the present specification discloses HUD systems that comprise a window member, a display source, and a reflective polarizer. The window member has a target area and at least a first exposed window surface at the target area. A first normal axis is associated with the exposed window surface. The display source, which may itself include one or more polarizers including e.g. an output polarizer, emits substantially p-polarized light toward the target area along an illumination axis. The illumination axis makes an acute angle $\theta_1$ with respect to the first normal axis. The reflective polarizer is disposed proximate the target area, and reflects at least some of the p-polarized light from the display source towards a viewing position. Notably, the reflective polarizer has a higher reflectivity for p-polarized light than for s-polarized light over an angular range that includes the angle $\theta_1$. In preferred embodiments the angular range is desirably at least about 20°, and more desirably at least about 40°, 60°, or more.

The reflective polarizer desirably is substantially transparent for the s-polarized component of the certain obliquely incident light, and is at least partially reflective for the p-polarized component. For example, the reflectivity for p-polarized light is at least about 20% and more desirably at least about 40% and the reflectivity of s-polarized light is less than about 10% and more desirably less than about 5% over the angular range.

Moreover, the light incident on the polarizer can comprise some or all of the visible portion of the electromagnetic spectrum. It can also comprise infrared wavelengths. Alternatively, the reflective polarizer can be configured such that both s-and p-polarized light, at near-normal incidence and at oblique angles, are highly reflected in the infrared region, in which case additional rejection of solar radiation for example can be achieved.

Additional and/or alternative features are set forth with more particularity below.

BRIEF DESCRIPTION OF THE DRAWINGS

Throughout the specification reference is made to the appended drawings, where like reference numerals designate like elements, and wherein.

DETAILED DESCRIPTION OF THE ILLUSTRATIVE EMBODIMENTS

Figure 1:
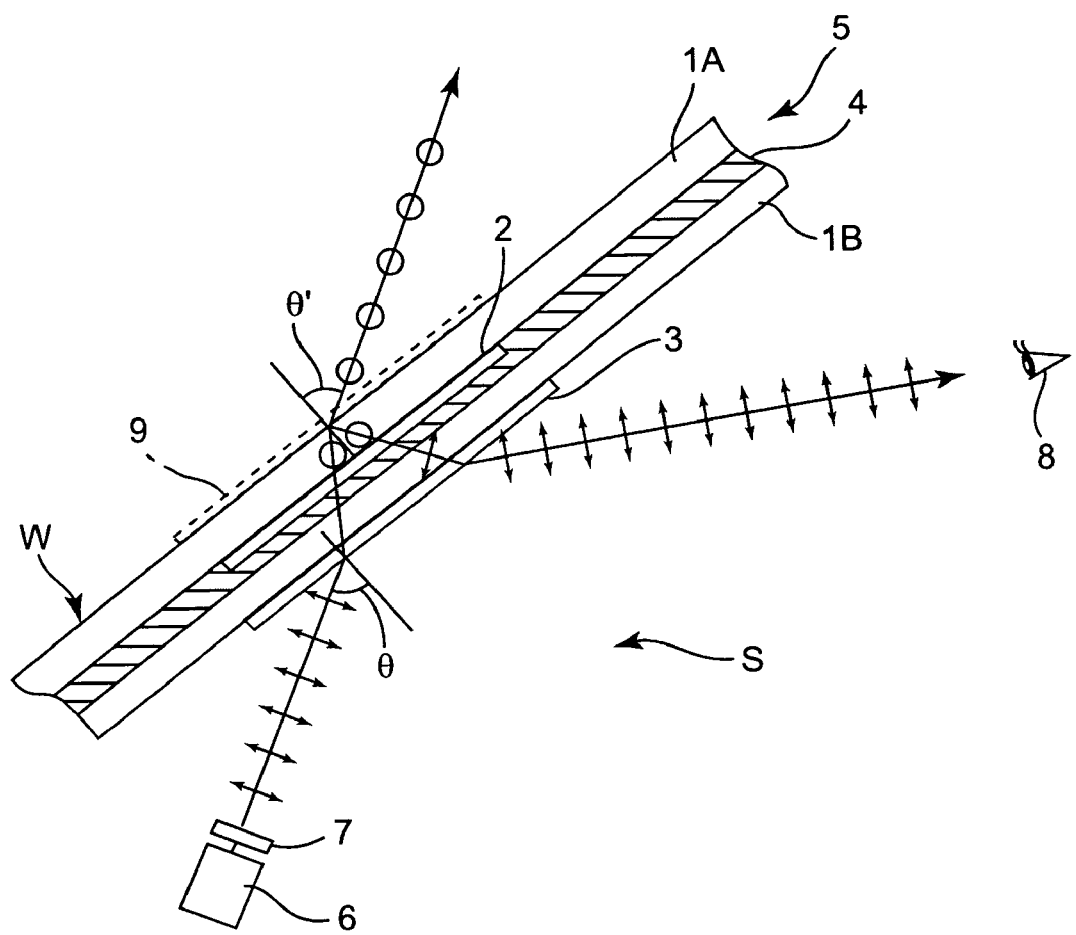
FIG. 1 is a fragmentary schematic sectional view of a PRIOR ART display system.
Figure 2:
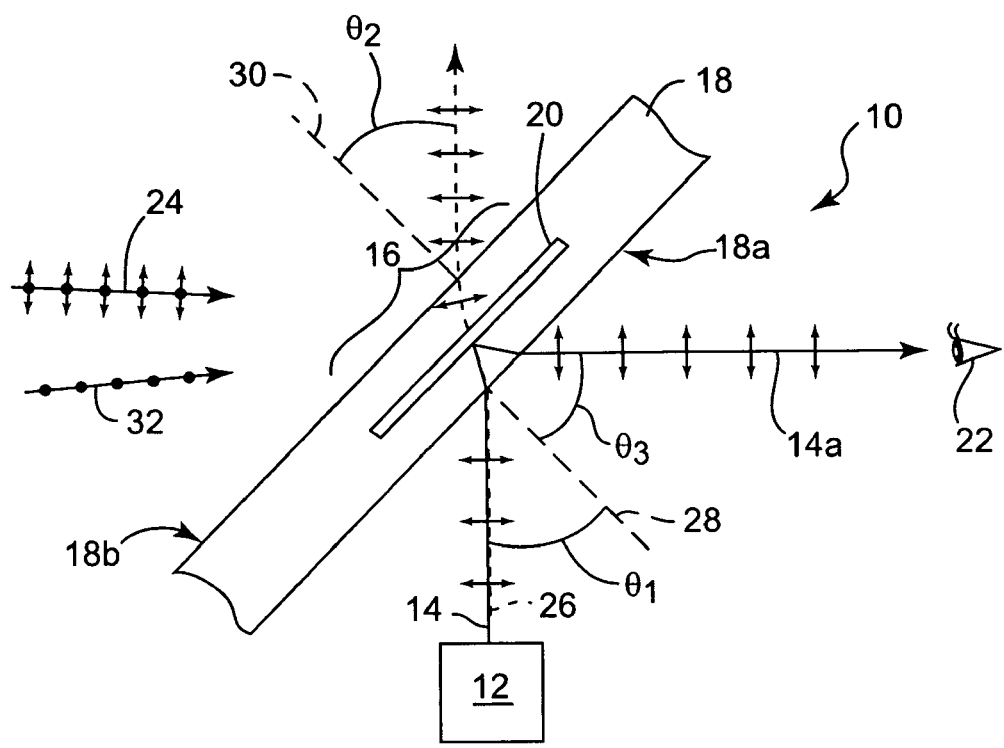
FIG. 2 is a fragmentary schematic sectional view of a HUD system as described herein.

A partial schematic view of an illustrative HUD system 10 is shown in FIG. 2. In brief, a projection system 12 is provided to direct light 14 towards a target area 16 of a window 18. A reflective polarizer 20, disposed proximate the target area 16, then reflects at least some of the projected light towards the intended viewer 22. Simultaneously, the reflective polarizer 20 and the window 18 transmit at least some light 24 from the outside environment to permit observation thereof by viewer 22.

Projection system 12 can be a conventional system that projects a visible light beam or image, and can include known elements such as an LCD, electroluminescent panel, incandescent or phosphorescent light source, CRT, LEDs, and lenses, collimators, reflectors, and/or polarizers. The emitted light can be substantially monochromatic, polychromatic, narrow band, or broad band, but preferably overlaps at least a portion of the (visible) spectrum from about 400 to 700 nm. Significantly, the light 14 emitted towards target area 16 is substantially linearly polarized in the plane of the figure as shown. While it is understood that system 12 will emit light over a finite angular cone, only one ray of light 14 is depicted for ease of illustration. Furthermore, system 12 can also include a mechanism such as a tilting mirror or displacement means to change the angle and/or position of emitted light so as to accommodate viewers at different positions or heights.

Light 14 travels along an illumination axis 26 and strikes a first exposed major surface 18a of window 18. As suggested previously, window 18 can comprise any of a wide variety of transparent members, and can be unitary or laminated, flat or curved (simple or compound curvature), water clear or tinted, can have focusing properties (e.g. in the case of goggles or other eyewear), and can be composed of any conventional glasses and/or plastics. For low cost and weight, the window can comprise a sheet of glass or other transparent material with plane parallel surfaces. As shown, the polarized light 14 strikes surface 18a at an acute angle $\theta_1$ with respect to an axis 28 that is normal to surface 18a at the point of entry. The normal axis 28 and illumination axis 26 define a plane of incidence that is coincident with the plane of the figure. Light 14 is polarized in the plane of incidence and thus is designated "p-polarized" light. As is known, ordinary optical materials such as glass and plastic exhibit a Brewster angle $\theta_B$ in air that is a function of the refractive index of the particular optical material, from roughly 55 to 60 degrees for typical window materials. Although strictly speaking $\theta_B$ is a function of optical wavelength due to dispersion, such effects are typically very minor and in most cases $\theta_B$ can be treated as constant over the visible spectrum. For light incident at the Brewster angle, any p-polarized component has zero reflectivity, while any s-polarized component (whose electric field vector is perpendicular to the plane of incidence) has a reflectivity even greater than its reflectivity at near normal incidence. P-polarized light incident at angles near $\theta_B$ experience nonzero but very low reflectivity. Therefore, by keeping incident angle $\theta_1$ equal to or close to $\theta_B$, and ensuring that light 14 has little or no s-polarization component, no significant reflection of projection light 14 takes place at surface 18a. This avoids a "ghost" image being created at surface 18a. The degree to which $\theta_1$ can deviate from $\theta_B$ while still maintaining "no significant reflection" depends on many system variables and requirements. Generally, deviations of at least a few degrees of arc are generally believed permissible. In some cases deviations of greater than 5 or even 10 degrees may be acceptable, since p-pol reflectivity is still typically much reduced at such angles compared to reflectivity at near-normal incidence, particularly for angles less than $\theta_B$. Note that some angular deviations from $\theta_B$ are unavoidable to the extent projection system 12 is uncollimated, target area 16 is extended, and surface 18a is non-flat.

Depending on the characteristics of reflective polarizer 20, some light from system 12 propagates onward to a second exposed major surface 18b of window 18. For some embodiments, surface 18b will be substantially parallel to surface 18a, and local normal axis 30 will be parallel to normal axis 28, and the Brewster angle for surface 18b will be the same as the Brewster angle for surface 18a—but these conditions will not in general be satisfied. Where the conditions are satisfied, or nearly satisfied, light 14 will exit window 18 at an exit angle $\theta_2$ equal to $\theta_1$ and will again experience no significant reflection due to the effective absence of s-polarized light and propagation at or near Brewster's angle. Hence, another "ghost" image is avoided.

In some embodiments it may be desirable or necessary to provide an antireflection coating on surface 18a and/or surface 18b. Such coatings are easier to fabricate for p-polarized light at high incidence angles (angles of at least about 40 degrees in air) than for s-polarized light at such angles. Further, Brewster angle regulating films as discussed in '314 Asakura et al. can also if desired be provided on the exposed window surfaces to make modest adjustments to $\theta_B$ in order to maintain low reflectivity at surfaces 18a, 18b. But for many embodiments antireflection coatings and Brewster angle regulating films can be completely avoided.

An ideal HUD system would provide substantial reflectivity for light from the imaging system while simultaneously providing high transmission for light coming from the external environment. For this reason, HUD system 10 incorporates reflective polarizer 20. Polarizer 20 can provide substantially complete transmission of one polarization of light (s-polarization) while providing selective reflection and transmission of the other polarization (p-polarization). Polarizer 20 preferably comprises a multilayer stack of alternating materials such as described in U.S. Pat. No. 5,882,774 (Jonza et al.), incorporated herein by reference. The polarization-specific reflection properties can be made wavelength specific by appropriate layer thickness selection, so that the polarizer is substantially transparent for all but the selected wavelength(s), where it becomes reflective for only p-polarized light. The selected wavelength(s) can be a single narrow band, multiple narrow bands, or a broad band. Any suitable degree of reflectivity for the chosen band of wavelengths can be achieved by control of the layer-to-layer refractive index differences and the total number of layers in the polarizer. Polarizer 20 can be fabricated from tens or hundreds of co-extruded polymer layers that are substantially nonabsorbing in the visible and near infrared wavelengths, such that the sum of reflectivity and transmissivity for the polarizer is 100%.

For purposes of the present application, unless otherwise indicated, reflectivities and transmissivities referred to in connection with the polarizing film do not take into account any Fresnel reflection that may occur at the outermost surfaces of the polarizing film. Thus, measurements on a sample of polarizing film in air will typically yield higher reflectivities and lower transmissivities as a result of such Fresnel reflections, unless, for example, the film is provided with anti-reflection coatings on its outer surfaces.

Appropriate control of the so-called z-index difference (i.e., the refractive index difference along an axis perpendicular to the plane of the polarizer) for adjacent layers in the stack can eliminate the Brewster angle for the polarizer, providing highly efficient reflection of p-polarized light. Such reflection can also be effective over a wide angular range to permit the same polarizing film to be useful in a variety of HUD systems having different incidence angles $\theta_1$, and/or for greater design flexibility. For instance, polarizer 20 need not be parallel to surface 18a or 18b. This would permit an exit angle $\theta_3$ (measured from axis 28) for light 14a to differ from incidence angle $\theta_1$.

Although typically the reflective polarizer will extend over only a small portion of a window—which portion would ordinarily correspond to the target area 16—the reflective polarizer in some embodiments can extend in a continuous strip across the entire window 18 or can even be fully coextensive with window 18. For motor vehicles, the strip can extend horizontally along a lower, upper, or intermediate portion of the windshield. Depending on the size of the window and the application, the target area can likewise extend over only a small portion, a strip, or the entire window.

One benefit of HUD system 10 is compatibility with polarized sunglasses. For many motor vehicle applications, glare from the outside environment tends to be polarized along a horizontal axis. This glare is represented by reference numeral 32 in FIG. 2. In contrast, the portion 14a of light from the projection system reflected by polarizer 20 toward the viewer 22 is polarized along an axis lying in a vertical plane. Conventional polarized sunglasses selectively transmit vertically polarized light and block horizontally polarized light, thus blocking glare 32 but transmitting the HUD reflected light 14a. Note that the sunglasses will also block the horizontal polarization component of desirable outside environment light 24. The reflective polarizer 20 in this case should not reflect all visible p-polarized light because very little of the desired outside environment light 24 would be seen by a sunglass-wearing viewer 22 through target area 16.

Figure 3:
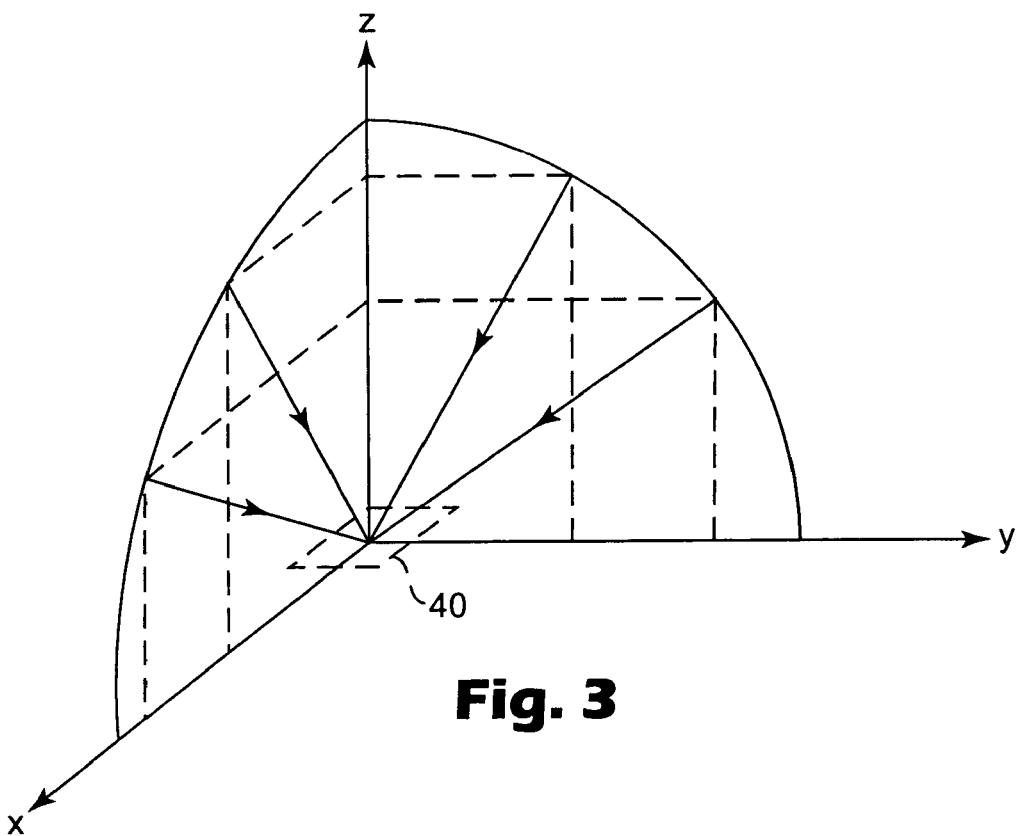
FIG. 3 depicts various obliquely incident light rays impinging on a partial reflector.

We turn now to FIG. 3, where a partial reflector 40, or a locally flat portion thereof, is shown lying in an x-y plane of an x-y-z Cartesian coordinate system. This reference system will be used in the discussion that follows to describe the properties and particularly the advantages of certain kinds of partial reflectors relative to others for the HUD system 10. Light rays are shown impinging obliquely on the reflector, with some rays lying in the x-z plane and others lying in the y-z plane. Light in either of these planes can have both an s- and p-polarization component. In cases where partial reflector 40 is a polarizer, the y-axis is designated as the pass-axis, and the x-axis is designated at the blocking or reflective axis. The angle of incidence θ is the acute angle between the direction in air of the incident light ray and the z-axis, which is orthogonal to partial reflector 40.

FIGS. 4–8 are presented for comparison purposes. The curves in these figures depict the general qualitative reflectivity characteristics of s- and p-polarized light as a function of incidence angle for certain partial reflectors, and they are not taken from real or even computed data. However, they are believed sufficiently accurate for comparison purposes. The curves assume a wavelength of light within the desired spectral band as discussed above.

Figure 4A:
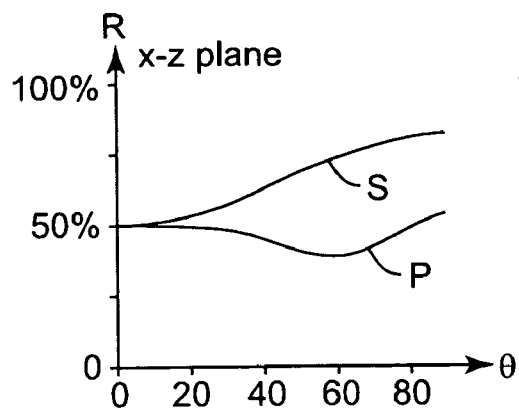
FIGS. 4a–b are simplified, idealized graphs showing the qualitative behavior of light reflectivity versus angle of incidence (in air), in the x-z plane and the y-z plane respectively, for a simple metal coating thin enough to act as a partial mirror.
Figure 4B:
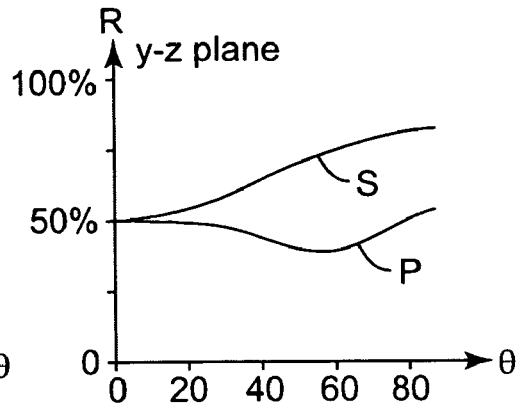

In FIGS. 4a and 4b, the reflectivity properties of a simple half-"silvered" mirror are shown for light incident in the x-z and y-z planes respectively. Such a partial reflector can be made of a single thin layer of silver, aluminum, gold, or other conventional metal disposed on a transparent substrate. The metal thickness is such that 50% of normally incident light is reflected. Note that transmission at normal incidence will be less than 50% since metals generally absorb visible light. The two figures are identical because the metal film is isotropic. As θ increases, reflectivity for s-polarized light increases. Reflectivity for p-polarized light dips somewhat, then increases. Although the p-pol reflectivity is quite high over a wide angular range of oblique incidence angles, including typical Brewster angles for glass and plastic, such a partial reflector will not work optimally in HUD system 10 because it would be difficult to see the outside environment through such a reflector. This is chiefly due to the s-pol reflectivity being on the order of or higher than the p-pol reflectivity throughout the angular range. Reducing the thickness of the metal layer can increase the transmission of the partial mirror to increase the visibility of the outside environment, but at the expense of reducing the brightness of the projected image.

Figure 5A:
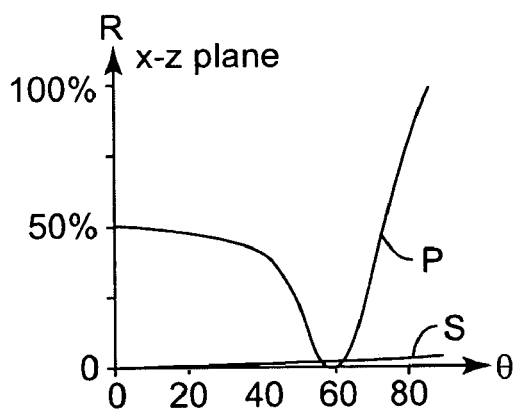
FIGS. 5a–b are graphs similar to FIGS. 4a–b but for a multilayer reflective polarizer wherein for alternating layers $\Delta n_x$ is large, $\Delta n_y$ is substantially zero, and $\Delta n_z$ is large and of the same polarity as $\Delta n_x$.
Figure 5B:
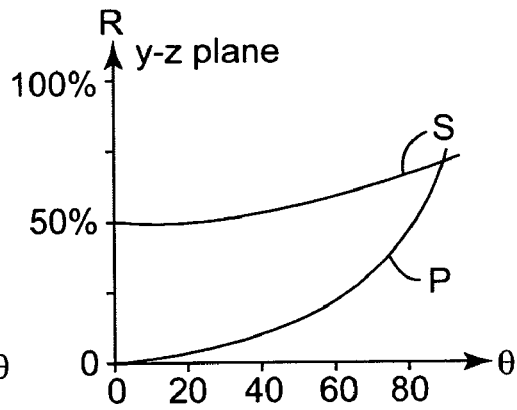

FIGS. 5a and 5b show the reflectivity properties for a multilayer birefringent reflective polarizer for light incident in the x-z and y-z planes respectively. The refractive index relationships between adjacent layers in the multilayer stack are:

$\Delta n_x \approx$ large (+)

$\Delta n_y \approx 0$ $\Delta n_z \approx$ large (+)

This is referred to as a "z-mismatched" polarizer. The "+" for $\Delta n_x$ and $\Delta n_z$ indicates those differentials are of the same polarity—the layer having the higher x-direction refractive index $n_x$ also has the higher z-direction refractive index nz, and vice versa. "Large" for $\Delta n_x$ means a refractive index difference sufficient to reflect one polarization of normally incident light by at least about 20%, and more preferably about 50% or more, for a given number of layers in the stack. For known birefringent polymer stacks this would typically be at least about 0.1, or at least about 0.2. Zero for $\Delta n_y$ means a refractive index difference small enough to reflect a negligible amount, preferably less than 10% or 5%, of the orthogonal polarization of normally incident light, for a given number of layers in the stack. For known birefringent polymer stacks this would typically be at most about 0.02, or 0.01. "Large" for $\Delta n_z$ means on the order of $\Delta n_x$.

As shown by the figures, the z-mismatched polarizer has some p-pol reflectivity in both the x-z plane and the y-z plane at oblique angles. In the y-z plane, p-pol reflectivity can be substantial over a wide angular range. But unfortunately the s-pol reflectivity is also very large over the same range. In the x-z plane, p-pol reflectivity is greater than s-pol reflectivity over a wide angular range, except where the former becomes zero due to Brewster angles effects in the multilayer stack itself. Moreover, the p-pol reflectivity changes rapidly as a function of incidence angle near the zero reflectivity point. The high s-pol reflectivity in the y-z plane, and the Brewster angle effect and rapid fluctuations of p-pol reflectivity in the x-z plane, mean that the z-mismatched polarizer also will not work optimally as a partial reflector in HUD system 10.

Figure 6A:
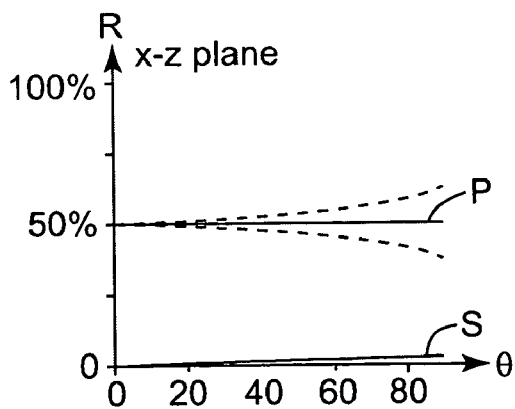
FIGS. 6a–b are graphs similar to FIGS. 5a–b but for a multilayer reflective polarizer wherein for alternating layers $\Delta n_x$ is large, $\Delta n_y$ is substantially zero, and $\Delta n_z$ is zero or very small compared to $\Delta n_x$.
Figure 6B:
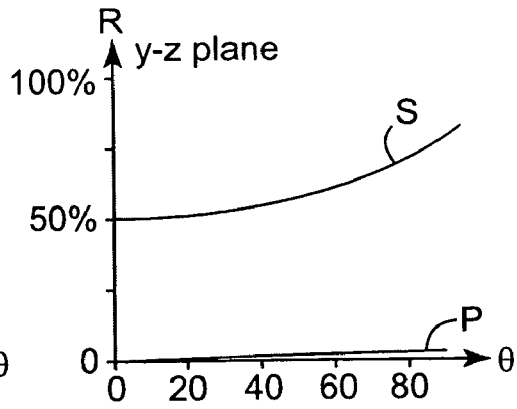

FIGS. 6a and 6b show the reflectivity properties for a different multilayer birefringent reflective polarizer for light incident in the x-z and y-z planes respectively. The refractive index relationships between adjacent layers in the multilayer stack are:

$\Delta nx \approx$ large $\Delta ny \approx 0$ $\Delta nz \approx 0$

This is referred to as a "z-matched" polarizer. "Large" for $\Delta n_x$ and zero for $\Delta n_y$ mean the same as in FIGS. 5a–b. Zero for $\Delta n_z$ means a refractive index difference whose absolute value is at least less than half of $\Delta n_x$, and more preferably less than one-fourth or one-tenth of $\Delta n_x$.

As shown in FIG. 6a, p-pol reflectivity for light in the x-z plane is relatively constant and substantially higher than s-pol reflectivity over a wide range of incidence angles, indeed over the entire range of incidence angles. The p-pol reflectivity decreases slightly with increasing θ for small $\Delta n_z$ values of the same polarity as $\Delta n_x$, and increases slightly with increasing θ for small $\Delta n_z$ values of the opposite polarity as $\Delta n_x$. This behavior is shown by the broken lines. The s-pol reflectivity is negligible—well below 10%, and well below 5%—over the entire range of incidence angles. In contrast, light incident in the y-z plane experiences high and increasing s-pol reflectivity with angle, and negligible p-pol reflectivity over the entire range of incidence angles. Clearly, the z-matched reflective polarizer is well suited as a partial reflector in HUD system 10. But as demonstrated by the differences between FIGS. 6a and 6b, the polarizer must be oriented properly for best performance. Preferably, the x-z plane coincides with the plane of FIG. 2. In motor vehicle applications, the pass-axis (y-axis) of the polarizer is preferably horizontal.

Figure 7A:
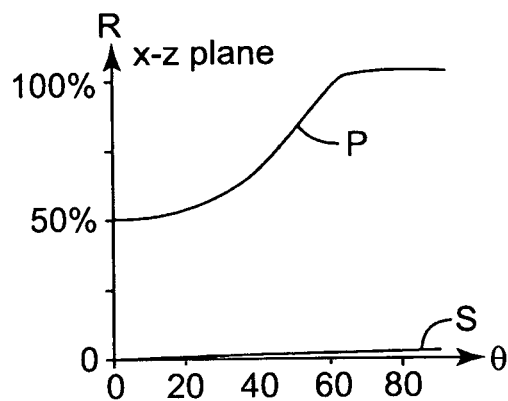
FIGS. 7a–b are graphs similar to FIGS. 6a–b but for a multilayer reflective polarizer wherein for alternating layers $\Delta n_x$ is large, $\Delta n_y$ is substantially zero, and $\Delta n_z$ is large but of opposite polarity to $\Delta n_x$.
Figure 7B:
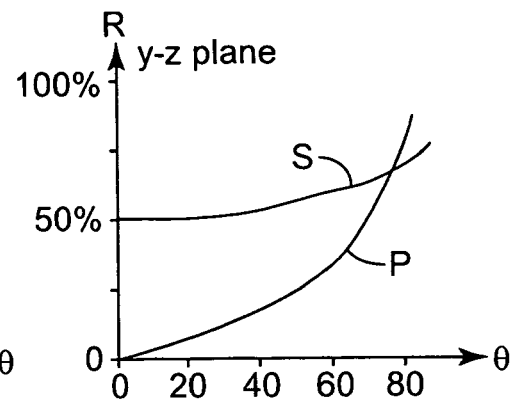

FIGS. 7a and 7b show the reflectivity properties for a different multilayer birefringent reflective polarizer for light incident in the x-z and y-z planes respectively. The refractive index relationships between adjacent layers in the multilayer stack are:

$\Delta n_x \approx$ large (+)

$\Delta n_y \approx 0$ $\Delta n_z \approx$ large (−)

This is referred to as a "negative z-mismatched" polarizer. "Large" for $\Delta n_x$ and zero for $\Delta n_y$ mean the same as in FIGS. 6a–b. "Large" for $\Delta n_z$ means having a magnitude of the same order as $\Delta n_x$. The "+" and "−" signs indicate that $\Delta n_x$ and $\Delta n_z$ are of opposite polarity: the layer having the higher value of $n_x$ has the lower value of $n_z$, and vice versa.

The reflectivity behavior of the negative z-mismatched polarizer is the same as that of the other z-mismatched polarizer for light in the y-z plane (compare FIGS. 7b and 5b). But for light in the x-z plane, the p-pol reflectivity is not only maintained but increases with angle as shown in FIG. 7a, while s-pol reflectivity remains negligible over all incidence angles. If desired, the total number of layers in the stack can be reduced and/or the magnitude of $\Delta n_x$ can be reduced to lower the p-pol reflectivity curve in FIG. 7a and increase or eliminate the angle at which the p-pol reflectivity reaches saturation. Whether or not this is done, the negative z-mismatched reflective polarizer provides high p-pol reflectivity and negligible s-pol reflectivity over a wide angular range, indeed over all angles of incidence for light in the x-z plane, making it generally well suited for use in the HUD system 10. However, the substantial increase of p-polarized light with θ may be disadvantageous in some applications.

Figure 8A:
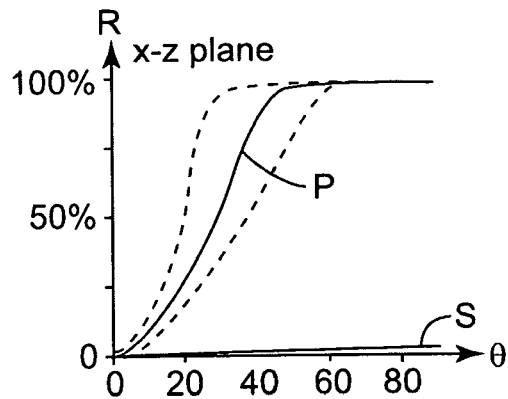
FIGS. 8a–b are graphs similar to FIGS. 7a–b but for a multilayer reflective polarizer wherein for alternating layers $\Delta n_x$ and $\Delta n_y$ are both substantially zero, but $\Delta n_z$ is large.
Figure 8B:
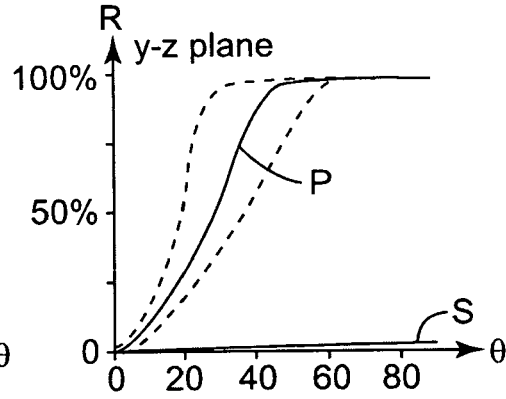

FIGS. 8a and 8b show the reflectivity properties for still another multilayer birefringent reflective polarizer for light incident in the x-z and y-z planes respectively. The refractive index relationships between adjacent layers in the multilayer stack are:

$\Delta n_x \approx 0$ $\Delta n_y \approx 0$ $\Delta n_z \approx$ large

This is referred to as an "off-axis" polarizer. Zero for $\Delta n_x$ and for $\Delta n_y$ mean sufficiently small to produce a negligible amount of on-axis ($\theta=0$) reflectivity for either polarization, e.g. less than about 10% or less than about 5%. "Large" for $\Delta n_z$ means large enough to produce a desired substantial amount of off-axis reflectivity. A preferred value for $\Delta n_z$ is about 0.1 or greater. Reference is made to commonly assigned U.S. patent application Ser. No. 10/334,836, entitled "P-Polarizer With Large Z-axis Refractive Index Difference", and U.S. patent application Ser. No. 10/335,460, entitled "Optical Polarizing Films With Designed Color Shifts", both incorporated herein by reference.

Note initially that FIGS. 8a and 8b are identical because of substantial symmetry of the off-axis polarizer in the plane of the film (the x-y plane). Beyond that, s-pol reflectivity is negligible over a wide angular range, indeed over all incidence angles. To the extent the in-plane index refractive indices are not exactly matched, there will be a small amount of s-pol reflectivity that increases with $\theta$. But note how the p-pol reflectivity increases rapidly with increasing $\theta$. The broken lines are provided to show that the curve can rise more rapidly with angle for larger values of $\Delta n_z$ (and/or more layers in the stack), and more slowly with angle for smaller values of $\Delta n_z$ (and/or fewer layers in the stack). Of course, further reductions can prevent the p-pol reflectivity from ever reaching saturation. In any event the off-axis polarizer can provide a substantial amount of p-pol reflectivity and an insubstantial amount of s-pol reflectivity over a wide angular range. Advantageously, this type of polarizer, and to a lesser extent the negative z-mismatched polarizer, provides higher levels of p-pol reflectivity at greater angles of incidence where the HUD incidence angle $\theta_1$ is more likely to be, and is more transparent at near-normal incidence. The off-axis polarizer is substantially clear at normal incidence. Another significant advantage specific to the off-axis polarizer is the ability to position it in the HUD system without regard to the polarizer orientation due to its in-plane symmetry. However, as discussed previously, the substantial increase in p-pol reflectivity with angle may be disadvantageous in some applications.

The reader's attention will now be turned to desirable spectral properties of suitable reflective polarizers. These properties are influenced not only by the refractive indices of the alternating layers in the multilayer stack, but also importantly by the layer thickness distribution throughout the stack. Also, these properties can change with angle of incidence.

Various reflective polarizer designs can be utilized for partial transmission of p-polarized light through the partial reflector for the HUD system. Two of these are: (1) colored polarizers that reflect only selected visible wavelengths of p-polarized light, and (2) broadband polarizers that reflect all visible wavelengths of p-polarized light uniformly, but at an intermediate level of reflectivity such as 25% or 50%. In the first type, the reflectivity within the band can be chosen to be up to 100%. It is understood that the reflection bands discussed here take into consideration any spectral shifts caused by the angular position of the light source with respect to the polarizer. That is, the reflection bands discussed here are the reflection bands of the polarizer at the intended use angle, not necessarily at normal incidence, unless otherwise specified.

One example of the first type of spectral properties is a reflective polarizer that exhibits a multiplicity of reflection bands separated by intervening transmission bands. For example, a cholesteric or thin-film reflective polarizer can be designed to reflect three relatively narrow wavelength bands in the red, green, and blue portions of the visible spectrum. As is well known, red, green, and blue light can be added in varying combinations to produce essentially any color of the spectrum. In this way, a full-color HUD can be created without the use of a polarizer that reflects the entire visible spectrum. Blue, green, and red reflection bands can be provided in the reflective polarizer in the spectral ranges between about 400–480 nm, 500–570 nm, and about 600–700 nm respectively. To maximize transmission efficiency, only a narrow portion of each of these ranges is reflected by the polarizer, preferably about 50 nm or less in width (full width at half maximum), more preferably about 10–40 nm in width, and most preferably about 10–30 nm in width. Reference is made to U.S. Pat. No. 6,157,490 (Wheatley et al.), incorporated herein by reference, for layer thickness distribution techniques that can provide sharp bandedges for narrow reflection bands with high maximum reflectivity values. If the display source emits light in three (or less than three) narrow bandwidths, then the narrow reflection bands of the polarizer at the intended incidence angle(s) overlap the emission wavelength(s) of the source. In some embodiments the polarizer can provide only one or two reflection bands in the visible region. Furthermore, the polarizer can also comprise one or more infrared reflection bands which, in vehicle applications, can reduce solar heating of the cabin environment.

Another example utilizing the first type of spectral properties is a HUD system wherein the reflective polarizer has a reflectance band located substantially entirely in the infrared range (which range includes the near infrared range) at normal incidence, but which band is shifted into visible wavelengths, typically red wavelengths, when incident at the chosen incidence angle. As a result, the reflective polarizer reflects red (and transmits cyan, the complement of red) p-polarized light at the use angle. In addition to its usefulness in a HUD, one advantage of such a reflective polarizer is that it can provide a cooling function by reflecting infrared radiation of at least one polarization away from the viewer. Reflective polarizers useable with this embodiment can be cholesteric reflective polarizers and thin-film reflective polarizers. A characteristic of both cholesteric and thin-film reflective polarizers is that the reflectivity spectrum shifts to shorter wavelengths with increasing angle of incidence $\theta$. In this embodiment the display source provides light—e.g., red light—within the shifted wavelength range. Reflectivity in the red can be tailored so that a sufficient amount of red light is transmitted through the target area of the window to enable the viewing of external red objects such as traffic lights. The latter is of concern only if the viewer is also wearing polarized sunglasses that would block substantially all of the orthogonally polarized (i.e., horizontally polarized) red light.

Since cholesteric polarizers reflect circularly polarized light, a quarter-wave plate is used to convert linear s- and p-polarized light to circular. The off-angle characteristics of the quarter-wave plate may be optimized by controlling the relative values of the x-, y-, and z-indices of the film.

Figure 9:
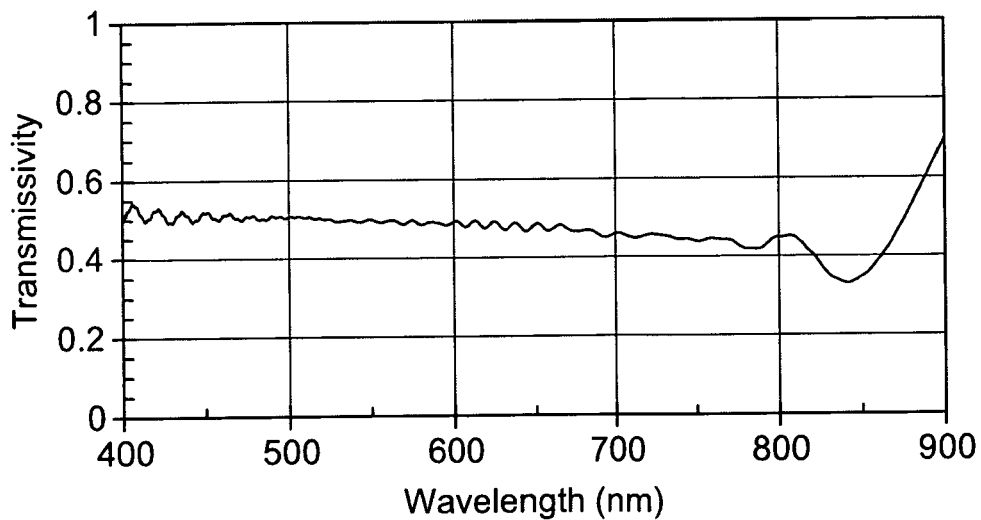
FIG. 9 is a computed graph of transmissivity versus wavelength for a broadband reflective polarizer, for one linear polarization component at normal incidence.
Figure 10:
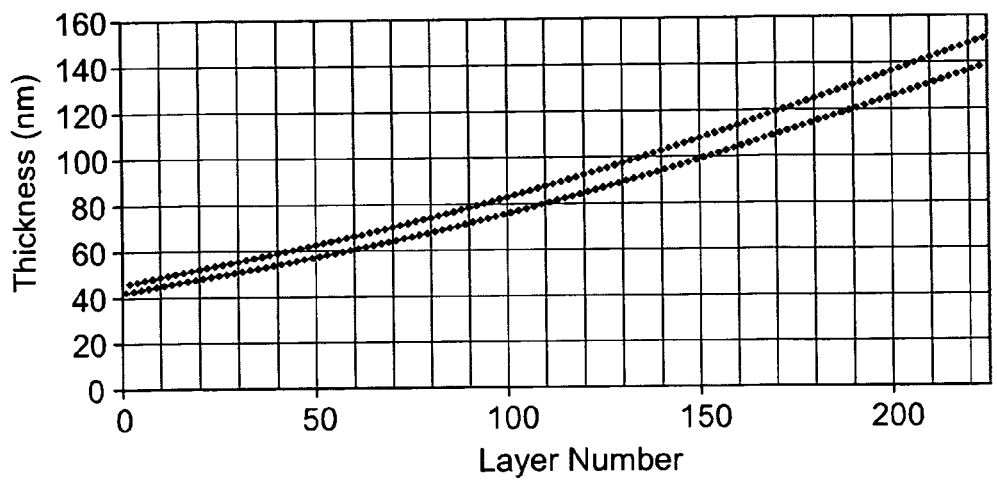
FIG. 10 is a plot showing the layer thickness profile of a multilayer thin film stack capable of producing the graph of FIG. 9.

For a full color HUD system that shows no coloration in the reflector in any lighting situation, it is advantageous to use a broadband reflective polarizer. The level of reflectivity can be adjusted such that any transmission requirement for the window is met, while still providing a high reflectance for the projected light. For example, a minimum average transmission of about 70% is required for front windshields of some motor vehicles. A broadband reflecting polarizer can thus be made with the transmission spectrum for one linear polarization at normal incidence shown in FIG. 9 and the orthogonal linear polarization having essentially 100% transmission. Such a film has approximately a 75% average transmission for unpolarized light. At the same time, since the sum of reflectivity and transmission for the preferred polarizers is substantially 100%, about 50% of the polarized projector light is directed towards the viewer. A z-matched thin-film polarizer having these spectral properties can be made with 224 individual layers having the layer thickness profile shown in FIG. 10. The points fall along two curves. The lower curve is for a first alternating material (e.g. polyethylene terephthalate (PET)) having a relatively high $n_x$ refractive index of 1.68. The upper curve is for a second alternating material (e.g. a copolyester) having a relatively low $n_x$ refractive index of 1.54. The y- and z-refractive index for all layers is 1.54. This example uses a graded quarter-wave stack design where the optical repeat unit within the multilayer stack consists essentially of two adjacent layers, where the total optical thickness of a given optical repeat unit equals half the optical reflected wavelength.

Other known stack designs, e.g. those using more than two layers per optical repeat unit, are also contemplated. In one such design, disclosed in U.S. Pat. No. 5,360,659 (Arends et al.), each optical repeat unit has six layers in which two alternating materials are arranged with relative optical thicknesses of about 7-1-1-7-1-1. In another design, disclosed in U.S. Pat. No. 5,103,337 (Schrenk et al.), each optical repeat unit has four layers in which three materials A, B, C, whose refractive indices are such that $n_A > n_B > n_C$ and where $n_B = \sqrt{(n_A n_C)}$, are arranged as ABCB with relative optical thicknesses of ⅓, ⅙, ⅓, ⅙ respectively. Hybrid film designs that utilize more than one of the quarter-wave construction, the 7-1-1-7-1-1 construction, and the ABCB construction are also contemplated.

Figure 11:
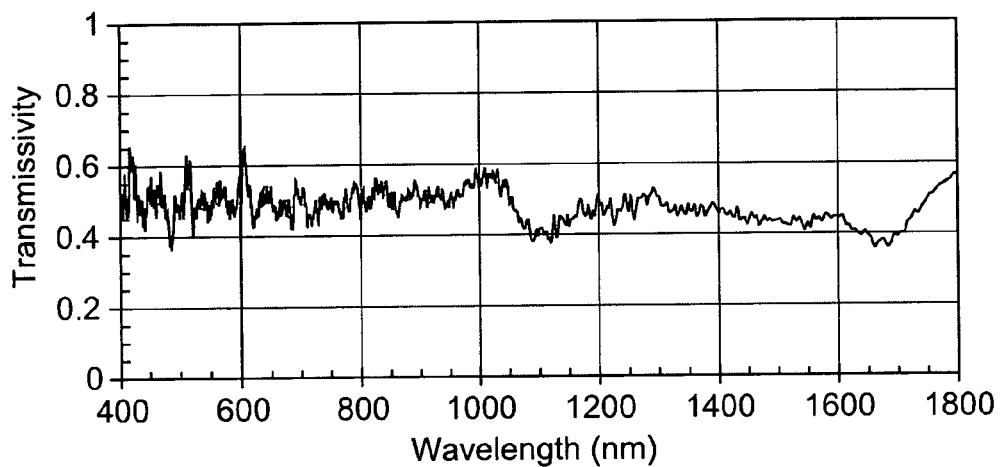
FIG. 11 is a computed graph of transmissivity versus wavelength for another broadband reflective polarizer, for one linear polarization component at normal incidence.
Figure 12:
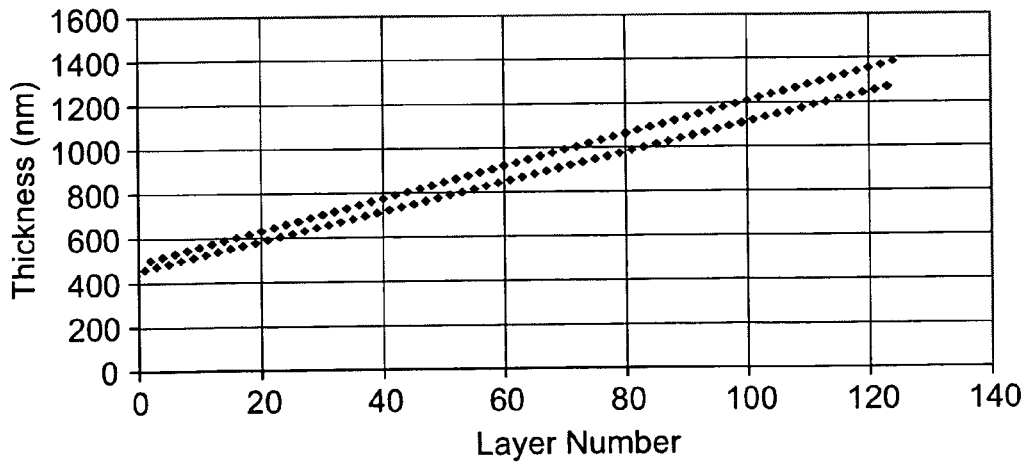
FIG. 12 is a plot showing the layer thickness profile of a multilayer thick film stack capable of producing the graph of FIG. 11.

An alternative approach to achieve broad band reflection is to use significantly thicker layers in the multilayer optical stack. The transmission spectrum shown in FIG. 11, for example, can be achieved in a z-matched polarizer using 124 thicker layers as shown in FIG. 12. The lower curve in FIG. 12 is for a first alternating material (PEN) having $n_x \approx 1.85$. The upper curve is for a second alternating material (PETG, available from Eastman Chemical Company) having $n_x \approx 1.565$. The y- and z-indices are all matched at 1.565, yielding a colorless transmission at all angles for the pass polarization. These indices can be achieved with PEN that is uniaxially oriented in a manner that allows the film to contract in the non-stretch direction. Note that this film has an approximately 50% reflectivity extending from 400 to 1800 nm for the p-polarization, thus reflecting approximately 25% of all solar radiation. This level of reflectivity will remain constant with increasing $\theta$ because of the z-index match.

Various modifications and alterations of this invention will be apparent to those skilled in the art without departing from the scope and spirit of this invention, and it should be understood that this invention is not limited to the illustrative embodiments set forth herein.

What is claimed is:

1. A system for displaying information to a viewing position, comprising:

a window member having a target area and at least a first exposed window surface at the target area, the first exposed window surface having associated therewith a first normal axis;

a display source that emits polarized light toward the target area along an illumination axis that makes an acute angle $\theta_1$ with respect to the first normal axis, the emitted light being substantially p-polarized and including a selected visible wavelength of interest; and a reflective polarizer disposed proximate the target area to reflect at least some of the p-polarized light from the display source towards the viewing position;

wherein the reflective polarizer reflects the p-polarized light in a narrow reflection band that includes the selected visible wavelength of interest over an angular range of incidence angles that includes the angle $\theta_1$.

2. The system of claim 1, wherein the selected visible wavelength of interest is one of a plurality of selected visible wavelengths.

3. The system of claim 2, wherein the narrow reflection band is one of a plurality of narrow reflection bands and wherein at least some of the reflection bands correspond to some of the selected visible wavelengths.

4. The system of claim 1, wherein the narrow reflection band is one of a plurality of narrow reflection bands.

5. The system of claim 1, wherein the narrow reflection band is 10–40 nm in width.

6. The system of claim 5, wherein the narrow reflection band is 10–30 nm in width.

7. The system of claim 1, wherein the reflective polarizer is substantially transparent for wavelengths outside the narrow reflection band.

8. The system of claim 1, wherein the narrow reflection band is located substantially entirely in the infrared range for light incident along the normal axis, and wherein the narrow reflection band shifts into visible wavelengths for light incident at the angle $\theta_1$.

9. The system of claim 1, wherein the reflective polarizer provides substantially complete transmission for s-polarized light and wherein the reflective polarizer provides selective reflection and transmission of p-polarized light.

10. The system of claim 9, wherein the selective reflection and transmission of p-polarized light includes a plurality of narrow reflection bands separated by intervening transmission bands.

11. The system of claim 9, wherein the selective reflection of p-polarized light includes a blue reflection band, a green reflection band, and a red reflection band for light incident at angle $\theta_1$.

12. The system of claim 11, wherein each of the blue, green, and red reflection bands is 10–40 nm in width.

13. The system of claim 1, wherein the reflective polarizer is a cholesteric reflective polarizer.

14. The system of claim 1, wherein the reflective polarizer is a thin film reflective polarizer.

* * * * *